US008666843B2

(12) United States Patent  
Allen et al.

(10) Patent No.: US 8,666,843 B2  
(45) Date of Patent: Mar. 4, 2014

(54) SYSTEMS AND METHODS FOR GENERATING A SYNCHRONOUS SALES STACK FOR CUSTOMER DIALOG

(75) Inventors: Timothy E. Allen, Raleigh, NC (US); John R. Mattox, Raleigh, NC (US); Darryl L. Pierce, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 477 days.

(21) Appl. No.: 12/114,586

(22) Filed: May 2, 2008

(65) Prior Publication Data

US 2009/0276323 A1 Nov. 5, 2009

(51) Int. Cl.
*G06Q 30/00* (2012.01)
(52) U.S. Cl.
USPC ............ 705/26.41; 705/26.1; 705/27.1
(58) Field of Classification Search
USPC ............ 705/26, 27, 26.1, 27.1, 26.41
See application file for complete search history.

(56) References Cited

U.S. PATENT DOCUMENTS

| | | | |
|---|---|---|---|
| 6,055,513 A | 4/2000 | Katz et al. | |
| 6,070,149 A * | 5/2000 | Tavor et al. | 705/26 |
| 7,249,056 B1 | 7/2007 | Crouthamel et al. | |
| 7,437,313 B1 * | 10/2008 | Mussman | 705/26 |
| 7,558,773 B2 * | 7/2009 | Mancisidor et al. | 706/52 |
| 8,160,938 B2 | 4/2012 | Allen | |
| 2001/0044751 A1 * | 11/2001 | Pugliese et al. | 705/26 |
| 2002/0077960 A1 | 6/2002 | Kiely et al. | |
| 2002/0116287 A1 | 8/2002 | Schubert et al. | |
| 2003/0004798 A1 | 1/2003 | McAuliffe et al. | |
| 2004/0098313 A1 | 5/2004 | Agarwal et al. | |
| 2006/0265288 A1 * | 11/2006 | Aronson | 705/26 |
| 2007/0150361 A1 | 6/2007 | Kreiner et al. | |
| 2007/0271149 A1 | 11/2007 | Siegel et al. | |
| 2008/0005055 A1 | 1/2008 | Horvitz | |
| 2009/0055261 A1 | 2/2009 | Yeh et al. | |
| 2009/0222231 A1 | 9/2009 | Berger et al. | |
| 2009/0222317 A1 | 9/2009 | Allen | |
| 2009/0299874 A1 | 12/2009 | Allen | |

FOREIGN PATENT DOCUMENTS

WO   WO 0140963 A1 *  6/2001

OTHER PUBLICATIONS

Business Editors, "IntelliQuest Announces General Availability of Innovative Internet-based Customer Management Program with coolsavings.com," Dec. 23, 1998, Business Wire, p. 1.
Office Action for U.S. Appl. No. 12/040,109 mailed Apr. 13, 2011.
Office Action for U.S. Appl. No. 12/040,109 mailed Aug. 16, 2011.

(Continued)

*Primary Examiner* — Courtney Stopp
(74) *Attorney, Agent, or Firm* — Lowenstein Sandler LLP

(57) ABSTRACT

Embodiments relate to systems and methods for generating a synchronous sales stack for a customer dialog. A user can visit a Web site and load selections into a checkout basket to prepare to purchase desired products and/or services. The user can select a live chat feature, which invokes an instant message, audio or video dialog with a sales representative. The sales representative can initiate a synchronous sales stack with the user, by which the user and sales representative can share a common view of purchase selections and potential alternatives or add-ons to the selections, as they are made. The customer and sales representative can continue their dialog as possible selections are explored, and the resulting sales stack is updated in real-time. When the user is satisfied with their selections, the sales stack can be stored as the customer's finalized checkout basket and the transaction can be completed.

12 Claims, 4 Drawing Sheets

(56) References Cited

OTHER PUBLICATIONS

Advisory Action for U.S. Appl. No. 12/040,109 mailed Oct. 21, 2011.
Office Action for U.S. Appl. No. 12/040,109 mailed Dec. 8, 2011.
Office Action for U.S. Appl. No. 12/040,109 mailed May 1, 2012.
Advisory Action for U.S. Appl. No. 12/040,109 mailed Jul. 13, 2012.
Office Action for U.S. Appl. No. 12/040,109 mailed Aug. 14, 2012.
Office Action for U.S. Appl. No. 12/040,109 mailed Dec. 31, 2012.
Advisory Action for U.S. Appl. No. 12/040,109 mailed Mar. 12, 2013.
Office Action for U.S. Appl. No. 12/040,109 mailed May 3, 2013.
Office Action for U.S. Appl. No. 12/129,327 mailed Jul. 27, 2009.
Office Action for U.S. Appl. No. 12/129,327 mailed Apr. 29, 2010.
Office Action for U.S. Appl. No. 12/129,327 mailed Oct. 29, 2010.
Office Action for U.S. Appl. No. 12/129,327 mailed Apr. 27, 2011.
Advisory Action for U.S. Appl. No. 12/129,327 mailed Aug. 9, 2010.
Notice of Allowance for U.S. Appl. No. 12/129,327 mailed Aug. 2, 2011.
Notice of Allowance for U.S. Appl. No. 12/129,327 mailed Dec. 13, 2011.

\* cited by examiner

SYSTEMS AND METHODS FOR GENERATING A SYNCHRONOUS SALES STACK FOR CUSTOMER DIALOG

FIELD

The present teachings relate to systems and methods for generating a synchronous sales stack for a customer dialog, and more particularly to platforms and techniques for generating a common view of a transaction stack that can be viewed and shared between a customer and a live chat sales representative.

BACKGROUND OF RELATED ART

In online transaction systems it has become relatively routine for a Web site to provide a live chat button which invites a sales representative into a text chat or voice chat dialog with the user. When a user engages in a live chat session with a sales representative, the representative may at times suggest alternative or additional purchases to the user. The user may be presented with more than one set of options or upgrades during a live chat session.

The sales representative may typically view different purchase options and upgrades in real time, via a product sales stack viewable on their side of the dialog. As those alternatives are explored, the user's checkout basket or other sales stack, however, remains filled with his or her originally selected items. The user may therefore not be able to readily follow the sales options being presented to them, since their options are not displayed, updated and organized in the same fashion as the view available to the sales representative. It may be desirable to provide methods and systems for generating a sales stack that can be shared between user and sales representative in an updateable common view.

DESCRIPTION OF THE DRAWINGS

The accompanying drawings, which are incorporated in and constitute a part of this specification, illustrate embodiments of the present teachings and together with the description, serve to explain the principles of the present teachings. In the figures.

DESCRIPTION OF EMBODIMENTS

Figure 1:
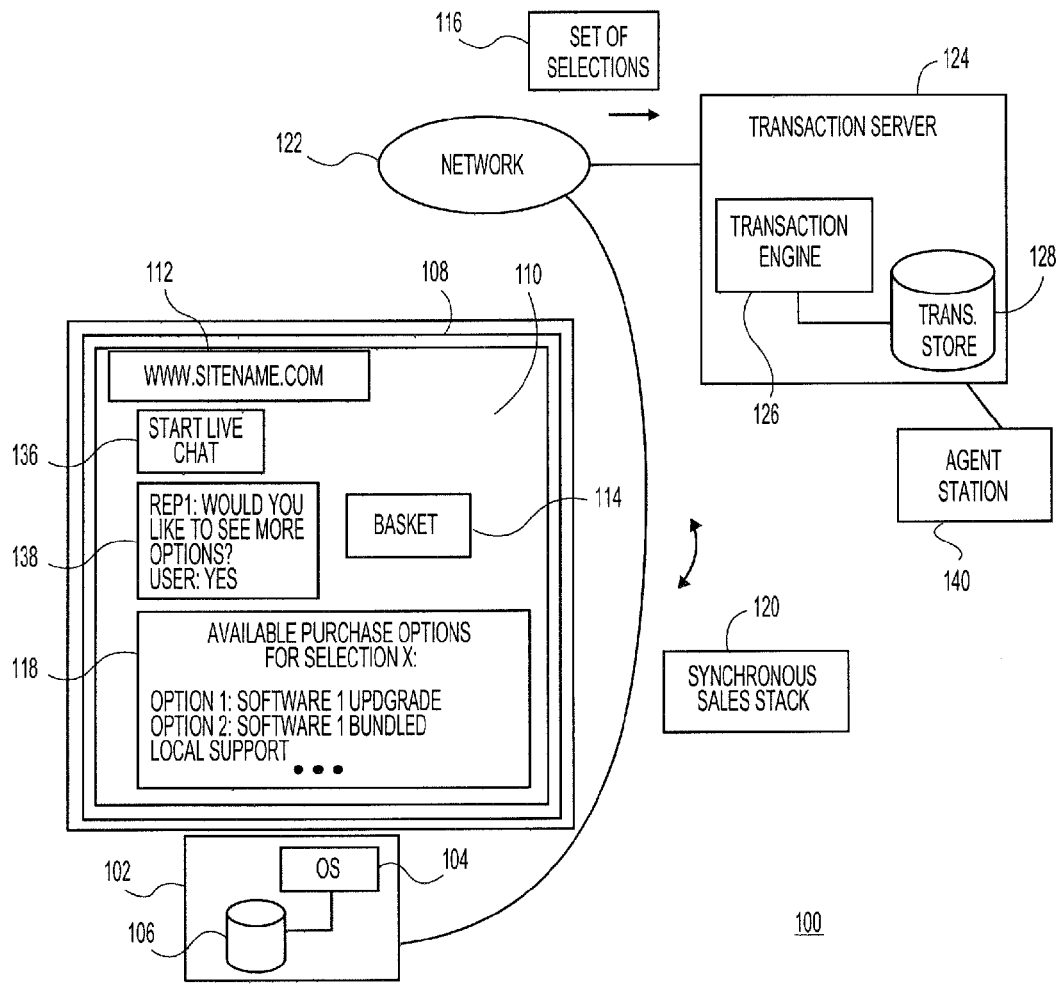
FIG. 1 illustrates an overall system for generating a synchronous sales stack for a customer dialog, according to various embodiments.

Embodiments of the present teachings relate to systems and methods for generating a synchronous sales stack for a customer dialog. More particularly, embodiments relate to platforms and techniques for generating a real-time or near real-time view of a transaction sales stack that can be shared between a user conducting a purchase transaction and a sales representative. A user can select items at a Web site for a purchase transaction and enter the set of selected items in a checkout basket. The user can be presented with a live chat option as part of the transaction, whereby the user can elect to initiate contact with a sales representative to discuss various aspects of their transaction. In embodiments, the live chat option can include text messaging, an audio link, or a video link.

As the user engages in a dialog with the sales representative, the sales representative may make suggestions and help to evaluate transaction options with the user via the live chat session. The sales representative may, for example, give the user an option of upgrading a baseline version of a software product to an enhanced version of that product, or offer the user the option of purchasing a product support plan. The sales representative can examine available transaction options using a sales stack table, in which sets of options associated with the user's selections can be recorded. As the user and sales representative discuss the potential transaction options, the sales representative can select various potential purchase updates and enter them into a synchronous sales stack representing a current set of potential product or service choices, and details about those potential choices. The sales representative can transmit the synchronous sales stack to the user to view and discuss via the live chat channel, along with the sales representative. The user and sales representative can continue to discuss potential alternatives or additions to the transaction. The sales representative can update the synchronous sales stack as options are discussed and explored. In embodiments, the user can select desired options contained in the synchronous sales stack via an option selector, such as a dialog box that displays a current set of potential alternatives or additions, along with transaction details such as items costs, delivery times, and other data. When the user and sales representative have arrived at a set of selected items satisfactory to the user, the user can make a finalized set of selections and the live chat channel can be closed. The user can then complete their purchase or other transaction, incorporating their desired alternatives or additions. These and other embodiments described herein address the various noted shortcomings in known electronic commerce technology, and assist a user with a common view of potential transaction options that can be shared with a sales representative on a real-time or near real-time basis, and clarify and organize the set of options available for the user's transaction while the transaction is in process.

Reference will now be made in detail to exemplary embodiments of the present teachings, which are illustrated in the accompanying drawings. Where possible the same reference numbers will be used throughout the drawings to refer to the same or like parts.

FIG. 1 illustrates an overall system 100 for generating a synchronous sales stack for a customer dialog, consistent with embodiments of the present teachings. In embodiments as shown, a user can operate a client 102 to use a browser 110 to navigate or browse to a site 112 via a network 122. Client 102 can be a computer, data-enabled cellular telephone, a network-enabled personal digital assistant (PDA), or other device. Browser 110 can be a Web browser, such as the Firefox™, Opera™, or other open-source or proprietary browser application. Site 112 can be identified by a uniform resource locator (URL), which can be in an http://www.sitename.com format under the hyper text transfer protocol. In embodiments, other types or formats of site addressing or identification can be used. Client 102 can host and run under control of an operating system 104, such as a distribution of the Linux™ operating system, the Unix™ operating system, or other open-source or proprietary operating system. Client 102 can present a user interface 108, such as a graphical user interface presenting icons, such as a mouse cursor, gadgets and other visual elements to the user to manipulate applications, data, and communications via operating system 104. Client 102 can contain or access resources including a local client data store 106, such as a local database stored on a hard drive.

In general, the user operates client 102 to initiate and use browser 110 to browse or navigate to one or more site 112 via network 122. Network 122 can be or include the Internet, or other public or private networks. Site 112 can be hosted by a transaction server 124, such as a Web server configured to execute online transactions, such as the purchase of hardware, software, and/or subscription to services. A user can view the products and/or services available from site 112, and select one or more of those items to include in their transaction. The set of items that the user has selected for their purchase or other transaction can be represented by a set of selections 116 stored in a basket 114. In embodiments, other types of transaction records and/or checkout mechanisms can be used.

According to embodiments as shown, when a user has completed their selections and basket 114 is generated, client 102 can transmit the basket 114 and/or set of selections 116 to transaction server 124 via network 122. Transaction server 124 can comprise hardware, software, logic and other resources to manage and execute electronic transactions across network 122, including transaction engine 126 and transaction store 128. In general, transaction engine 126 can receive the user's set of selections 116 and identify individual products and/or services that the user is attempting to purchase in the transaction.

Transaction server 124 also interfaces to an agent station 140, such as a personal computer or other local or remote terminal by which a sales representative or other agent or administrator can interact with the transaction engine 126, one or more pending transaction executing on transaction server 124, and the user initiating or requesting the transaction. The user can be presented with a live chat selection gadget 136, such as a selectable button or other element permitting the user to initiate a live chat communication with a sales representative or other agent operating agent station 140. Activation of the live chat selection gadget 136 can initiate a chat dialog 138, such as a text chat dialog. In embodiments, the live chat communication can instead or in addition be or include an audio link such as a voice over IP (VoIP) telephone connection, a video link, or other channel or link to the sales representative operating agent station 140.

After the user activates the live chat selection gadget 136 and establishes a chat dialog 138 to agent station 140, a sales representative or other agent operating agent station 140 can review the user's set of selections 116 and/or other transaction data to engage in a dialog with the user regarding potential options for their transaction. In the course of the communication conducted via chat dialog 138, the sales representative can discuss and evaluate various upgrades, additions, substitutions, or other options for the user to consider in connection with their pending transaction. When the user expresses interest in one or more given potential options or at other times, the sales representative can select those options and enter them into a synchronous sales stack 120. The synchronous sales stack 120 can be a data structure containing information related to the current transaction and potential options for the transaction, including the user's set of selections 116 and options temporarily or otherwise under consideration by the user. In embodiments, for example, the synchronous sales stack 120 can record potential upgrades to a set of software the user has selected, for instance to convert to an enterprise version of an email host package, or to extend technical support for selected products. The synchronous sales stack 120 can include pricing information for the original set of selections as well as all options presented in the synchronous sales stack 120. After the synchronous sales stack 120 is transmitted to the requesting client 102 operated by the user, the user can be presented with an options dialog 118 displaying the potential options contained in synchronous sales stack 120 in a selectable format. The options dialog 118 can for example present a selectable list of products and/or services contained in synchronous sales stack 120. While viewing options dialog 118, the user can continue to communicate with the sales representative via chat dialog 138, for instance to discuss the options that are appearing in options dialog 118 and/or further possible options. In embodiments, the options dialog 118 can be incorporated directly into basket 114, in chat dialog 138, or in other interfaces or elements presented by client 102 rather than form a separate gadget or interface.

In embodiments, the sales representative can update the synchronous sales stack 120 during the active dialog with the user, and transmit the updated stack to client 102 to generate a refreshed options dialog 118 on client 102, in interactive fashion. The user and sales representative or other agent can then continue to explore, display and evaluate potential transaction options until the user is satisfied to accept a set of options, adjustments or changes, or the user declines to incorporate the presented options in the transaction. In embodiments, the user can then proceed to complete the transaction via transaction server 124, for instance by supplying payment information, delivery information and the like and completing the transaction. In embodiments, the user and/or sales representative can save the synchronous sales stack 120 for future reference, for instance to complete a later transaction.

Figure 2:
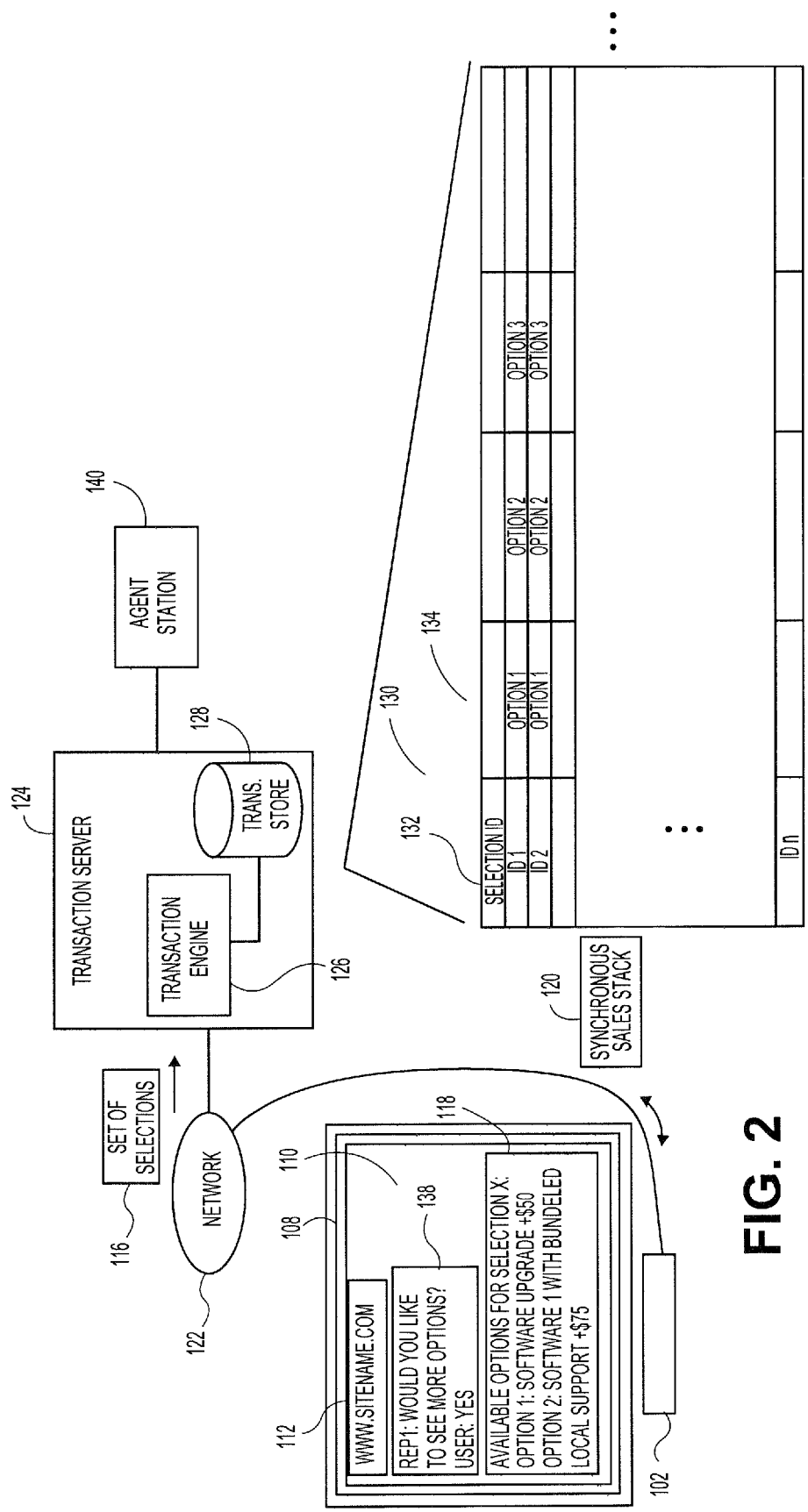
FIG. 2 illustrates an overall system for generating a synchronous sales stack for a customer dialog in further regards including a sales stack table, according to various embodiments.

According to embodiments illustrated for example in FIG. 2, the sales representative can operate agent station 140 to view and manipulate information related to user transaction, including a sales stack table 130 reflecting transaction information. Sales stack table 130 can be stored in transaction store 128. Sales stack table 130 can comprise a selection ID field 132, containing identifiers for products and/or services that are available to a user to select for purchase, subscription, or other transaction. The sales stack table 130 can further comprise a set of option fields 134 containing potential upgrades, substitutions, additions, or other options associated with a given product/service identified by a selection ID field 132. In embodiments, the set of option fields 134 can be loaded from or related to site 112, or can be loaded from other affiliate sites or other sources.

Upon receipt of the user's set of selections 116 at agent station 140 and activation of live chat selection gadget 136, the sales representative can access the sales stack table 130. The sales representative can invoke transaction engine 126 and associated tools, such as a database engine, to generate a comparison of the user's set of selections 116 and sales stack table 130 to determine matching options in the set of option fields 134. The sales representative can present and discuss those options with the user via chat dialog 138. As the user considers the potential options for their transaction, the sales representative can update synchronous sales stack 120 at agent station 140, and transmit synchronous sales stack 120 to the client 102 operated by the user. The user can view the options in options dialog 118 at the same time as the sales representative viewing the same options reflected in synchronous sales stack 120 at agent station 140. During the course of communication via chat dialog 138, the sales representative can repeatedly update and transmit synchronous sales stack 120 to the client 102 for the user to view via options dialog 118. In embodiments, the user and/or sales representative can backtrack to a prior version of synchronous sales stack 120, depending on user preference. In embodiments, if the user expresses a desire to temporarily discontinue the transaction discussion, the sales representative can save synchronous sales stack 120 to continue the dialog at a later time. When the user has finished reviewed, considering and selecting options they wish to purchase, those options can be saved in a finalized set of selections 116 or otherwise incorporated in a finalized transaction record. The sales representative and/or user can then terminate the chat dialog 138, before or after completing the transaction. The user can complete the transaction by entering account information, payment information, delivery information, or other data to complete and execute the finalized transaction via transaction server 124, or other platform or location. In embodiments a record of the completed transaction can be stored to transaction store 128 or other storage.

Figure 3:
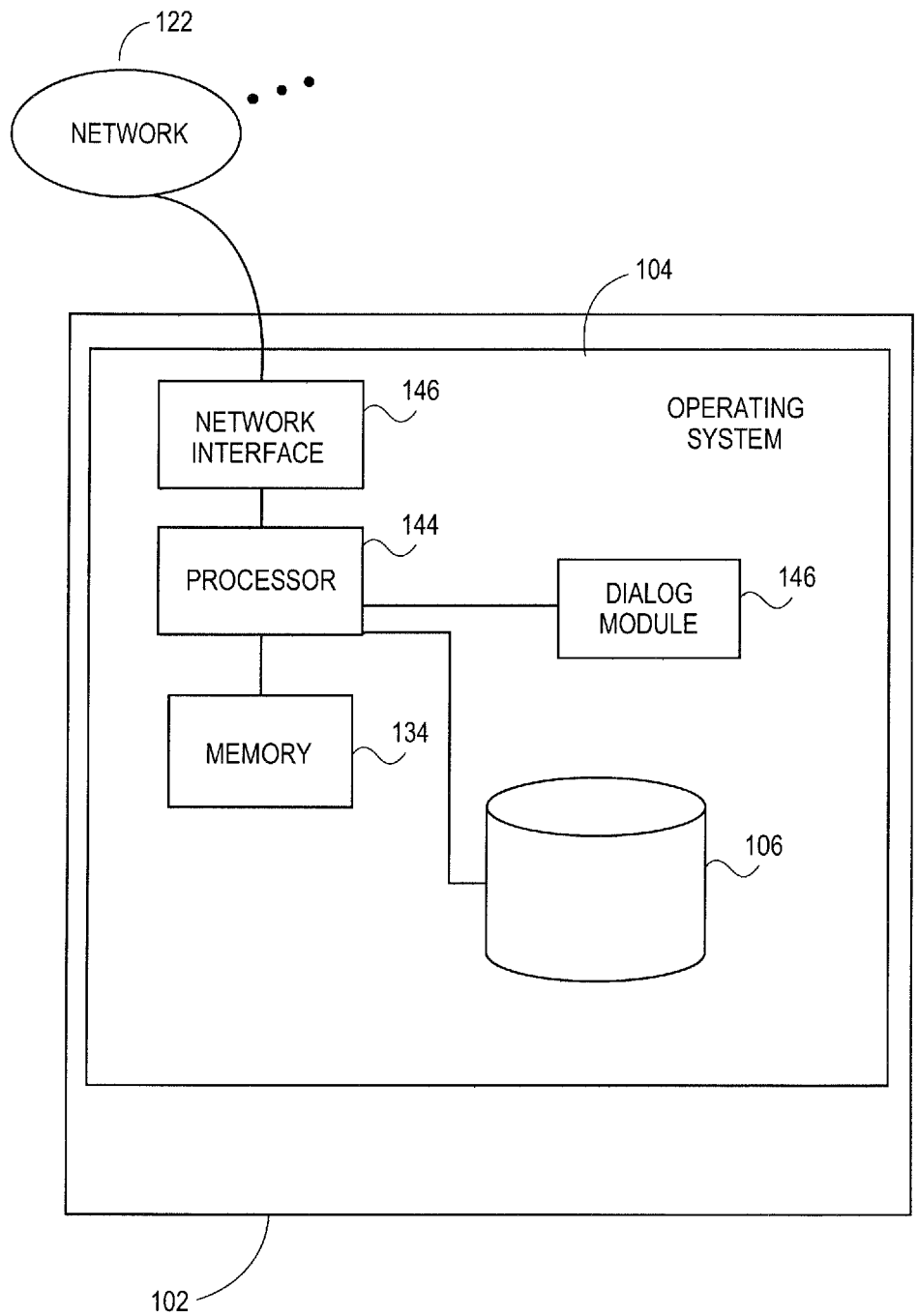
FIG. 3 illustrates an exemplary hardware configuration for a client that can be used in systems and methods for generating a synchronous sales stack for a customer dialog, according to various embodiments.

FIG. 3 illustrates an illustrative configuration of hardware and other resources that can be incorporated in an individual client 102 with which site 112, transaction server 128, and/or set of vendors 124 can communicate via network 122, according to embodiments. In embodiments as shown, client 102 can comprise a processor 142 communicating with memory 144, such as electronic random access memory, operating under control of or in conjunction with operating system 104. Processor 142 also communicates with local client store 106, such as a database stored on a local hard drive. Processor 142 further communicates with network interface 146, such as an Ethernet or wireless data connection, which in turn communicates with network 122, such as the Internet or other public or private networks. Processor 138 can also communicate with a dialog module 148 to generate and receive responses from user dialogs and other interfaces. Other configurations of client 102, associated network connections, and other hardware and software resources are possible.

Figure 4:
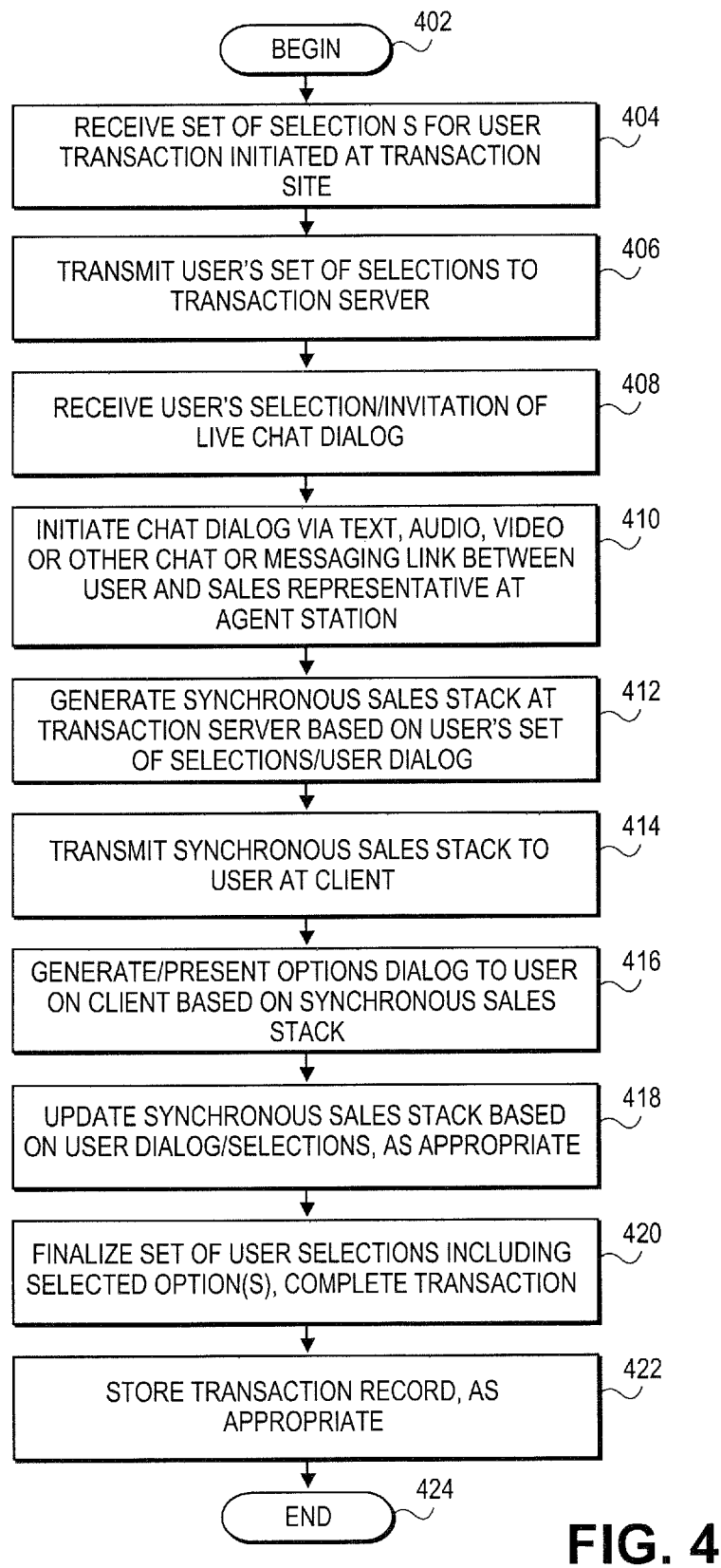
FIG. 4 illustrates a flow diagram for overall processing to generate a synchronous sales stack for a customer dialog, according to various embodiments.

FIG. 4 illustrates a flow diagram of overall transaction processing for generating a synchronous sales stack for a customer dialog during a transaction process, according to embodiments of the present teachings. In step 402, processing can begin. In step 404, a set of selections 116 can be received from a user operating a client 102 to access a site 112 where a transaction is initiated. The set of selections 116 can be or include, for example, software products or subscriptions, hardware products, and/or services such as technical support or warranty plans. The set of selections 116 can be, for instance, be enumerated and stored in a basket 114 generated at the time of the user's initiation of the transaction. In step 406, the set of selections 116 can be transmitted to a transaction server 124 via network 122, such as the Internet. In step 408, the transaction server 124 can receive the user's selection or initiation of a live chat session, for example, by clicking or activating a live chat selection gadget 136, such as a radio button.

In step 410, in response to the user's activation, transaction server 124 can initiate a chat dialog 138, for instance a text, audio, video, or other chat or messaging link between a sales representative at agent station 140 and the user at client 102. In step 412, the transaction server 124 can generate a synchronous sales stack 120 encapsulating the user's set of selections 116 and any set of options suggested by the representative based on the chat dialog 138 and the user's expressed interests. In step 414, the transaction server 124 transmits synchronous sales stack 120 to the user at the requesting client 120 via network 122. In step 416, client 102 can generate options dialog 118 listing the set of transaction options currently being explored in a common view of synchronous sales stack 120 and/or the contents thereof, shared between the user at client 102 and the sales representative at agent station 140.

In step 418, synchronous sales stack 120 can be updated by the sales representative at agent station 140 based on further user selections and/or chat dialog 138, as appropriate. In embodiments the updating of synchronous sales stack 120 can be repeated any number of times. In step 420, the user can finalize his or her set of selections 116 including options ultimately accepted from options dialog 138, and complete the transaction. In step 422, transaction engine 126 can store a transaction record including the finalized set of selections 116, synchronous sales stack 120 at one or more points in the transaction process, and other data to transaction store 128, as appropriate. In step 424, as understood by persons skilled in the art, processing can repeat, return to a prior processing point, jump to a further processing point, or end.

The foregoing description is illustrative, and variations in configuration and implementation may occur to persons skilled in the art. For example, while embodiments have been described in which a synchronous sales stack 120 is generated by a single transaction server 124, in embodiments the synchronous sales stack 120 and/or the selection contents of that stack can be aggregated from multiple servers, data stores, or other resources. For further example, while embodiments have been described in which a user can engage in a live chat dialog with a single sales representative or other agent, in embodiments more than one agent can engage in a live chat dialog with one or more users, together or in succession. Other resources described as singular or integrated can in embodiments be plural or distributed, and resources described as multiple or distributed can in embodiments be combined. The scope of the invention is accordingly intended to be limited only by the following claims.

What is claimed is:

1. A method comprising:
    receiving, from a user device via a website, one or more selections of one or more first items available for purchase in a transaction;
    adding the one or more first items to a transaction record for the transaction in view of the received one or more selections of the one or more first items;
    providing, to the user device via the website, the transaction record for presentation at the user device in view of the addition of the one or more first items to the transaction record;
    initiating, by a processor via the website, a live dialog between a representative device and the user device;
    identifying one or more additional related items;
    generating, by the processor, a selectable comparison of the one or more first items to the one or more additional related items;
    providing the comparison of the one or more first items and the one or more additional related items to the representative device;
    receiving, from the representative device, a selection from the comparison of at least a second item from the one or more additional items in view of a communication regarding the transaction received by the representative device from the user device via the live dialog;
    generating a common view that comprises at least the selected second item in view of the received selection of the second item from the one or more additional items;
    providing, to the user device via the website and to the representative device, the generated common view for presentation at the user device and the representative device in view of the generation of the common view;

receiving, from the user device via the website, a selection of the second item from the common view;

adding the second item to the transaction record in view of the received selection of the second item from the common view; and providing, to the user device via the website, the transaction record for presentation at the user device in view of the addition of the second item to the transaction record, wherein the transaction record comprises the one or more first items and the second item.

2. The method of claim 1, wherein the network comprises one or more public or private networks.

3. The method of claim 1, wherein the live dialog comprises at least one of text chat, an audio link, or a video link.

4. The method of claim 1, further comprising completing the transaction for the purchase of the one or more first items and the second item.

5. A system comprising:

a network interface to user device and a representative device; and a processor, to communicate with the network interface to:

receive, from the user device via a website, one or more selections of one or more first items available for purchase in a transaction;

add the one or more first items to a transaction record for the transaction in view of the received one or more selections of the one or more first items;

provide, to the user device via the website, the transaction record for presentation at the user device in view of the addition of the one or more first items to the transaction record;

initiate, via the website, a live dialog between the representative device and the user device;

identify one or more additional related items;

generate a selectable comparison of the one or more first items to the one or more additional related items;

provide the comparison of the one or more first items and the one or more additional related items to the representative device;

receive from the representative device, a selection from the comparison of at least a second item from the one or more additional items in view of a communication regarding the transaction received by the representative device from the user device via the live dialog;

generate a common view that comprises at least the selected second item in view of the received selection of the second item from the one or more additional items;

provide, to the user device via the website and to the representative device, the generated common view for presentation at the user device and the representative device in view of the generation of the common view;

receive, from the user device via the website, a selection of the second item from the common view;

add the second item to the transaction record in view of the received selection of the second item from the common view; and provide, to the user device via the website, the transaction record for presentation at the user device in view of the addition of the second item to the transaction record, wherein the transaction record comprises the one or more first items and the second item.

6. The system of claim 5, wherein the network comprises one or more public or private networks.

7. The system of claim 5, wherein the live dialog comprises at least one of text chat, an audio link, or a video link.

8. The system of claim 5, wherein the processor is further to complete the transaction for the purchase of the one or more first items and the second item.

9. A non-transitory computer readable storage medium comprising instructions to cause a processor to perform operations comprising:

receiving, from a user device via a website, one or more selections of one or more first items available for purchase in a transaction;

adding the one or more first items to a transaction record for the transaction in view of the received one or more selections of the one or more first items;

providing, to the user device via the website, the transaction record for presentation at the user device in view of the addition of the one or more first items to the transaction record;

initiating, by a processor via the website, a live dialog between a representative device and the user device;

identifying one or more additional related items;

generating, by the processor, a selectable comparison of the one or more first items to the one or more additional related items;

providing the comparison of the one or more first items and the one or more additional related items to the representative device;

receiving, from the representative device, a selection from the comparison of at least a second item from the one or more additional items in view of a communication regarding the transaction received by the representative device from the user device via the live dialog;

generating a common view that comprises at least the selected second item in view of the received selection of the second item from the one or more additional items;

providing, to the user device via the website and to the representative device, the generated common view for presentation at the user device and the representative device in view of the generation of the common view;

receiving, from the user device via the website, a selection of the second item from the common view;

adding the second item to the transaction record in view of the received selection of the second item from the common view; and providing, to the user device via the website, the transaction record for presentation at the user device in view of the addition of the second item to the transaction record, wherein the transaction record comprises the one or more first items and the second item.

10. The non-transitory computer readable storage medium of claim 9, wherein the network comprises one or more public or private networks.

11. The non-transitory computer readable storage medium of claim 9, wherein the live dialog comprises at least one of text chat, an audio link, or a video link.

12. The non-transitory computer readable storage medium of claim 9, wherein the operations further comprise completing the transaction for the purchase of the one or more first items and the second item.

* * * * *